Aug. 30, 1932.    W. M. SPOOR    1,874,135

CLEARANCE VALVE CONSTRUCTION

Filed March 1, 1929

INVENTOR.
William M. Spoor
BY
HIS ATTORNEY

Patented Aug. 30, 1932

1,874,135

UNITED STATES PATENT OFFICE

WILLIAM M. SPOOR, OF PAINTED POST, NEW YORK, ASSIGNOR TO INGERSOLL-RAND COMPANY, OF JERSEY CITY, NEW JERSEY, A CORPORATION OF NEW JERSEY

CLEARANCE VALVE CONSTRUCTION

Application filed March 1, 1929. Serial No. 343,744.

This invention relates to compressors, but more particularly to valves for compressors and specifically to that type of valve known as a clearance control valve.

In the ordinary clearance control valve, trouble is encountered due to breakage caused by the valve slamming back on its seat when the pressure from the unloader is applied to return the valve. It is the object of this invention to overcome the objection mentioned above and to provide a valve which shall be durable and operate smoothly without noise.

Figures 2, 3:
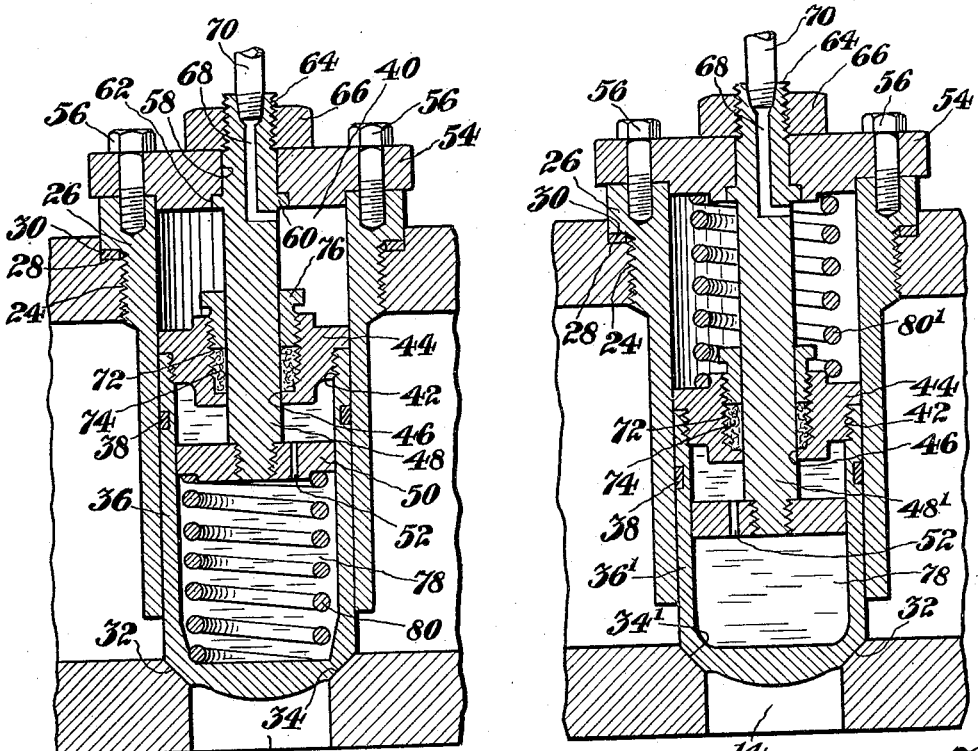
Figure 1:
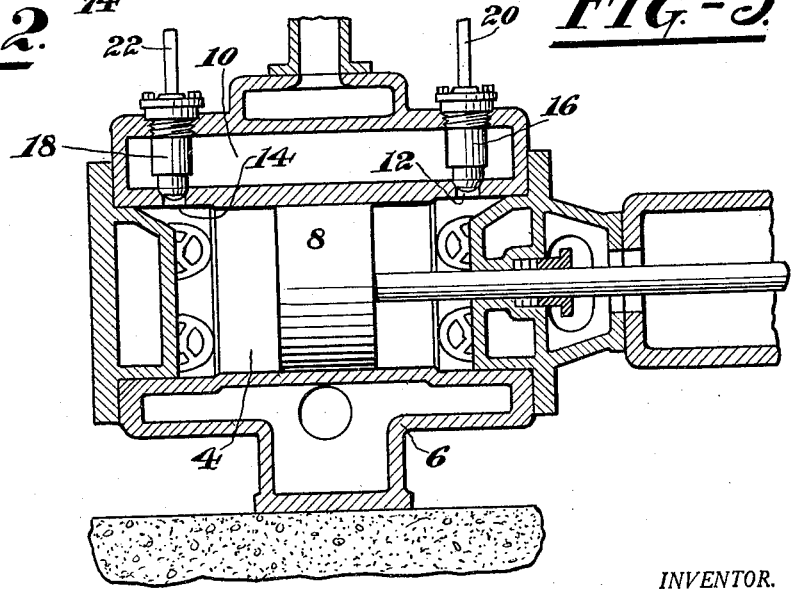

The object is accomplished by the construction shown in the accompanying drawing, in which Figure 1 is a longitudinal cross sectional view of a compressor cylinder showing the clearance control valves in place, Figure 2 is a cross sectional view of the clearance control valve and part of the cylinder, as constructed according to this invention, and Figure 3 is a view similar to Figure 2 showing a modification of the construction shown in Figure 2.

Referring more particularly to the drawing, 4 is the cylinder of an air compressor mounted on a base 6. A piston 8 is reciprocably mounted in the cylinder to which a clearance pocket 10 is connected by means of the ports 12 and 14. Clearance control valves 16 and 18 are operated by pressure fluid entering the valve mechanism through pipes 20 and 22 from an unloader (not shown).

The detailed construction of the valves is as follows: A threaded aperture 24 is formed in the outer wall of the clearance pocket and a correspondingly threaded cylindrical guiding element 26 open at its lower end is screwed into the aperture 24. A packing ring 28 serves to make an air tight joint between the shoulder 30 of the cylindrical element and the clearance pocket wall. The port 14 has a valve seat 32 at its upper end, the port and valve seat being concentric with the axis of the aperture 24. A valve 34 having a tubular extension or stem 36 of uniform diameter throughout its length is placed within the cylindrical element 26. The walls of the valve extension 36 and the cylindrical element 26 are ground so as to make a sliding fit therebetween and a packing ring 38 is set into the valve extension 36 to prevent the leakage of pressure fluid from a chamber 40 in the cylindrical element 26. A threaded section 42 of the valve extension 36 is adapted to receive a correspondingly threaded plug 44. The plug 44 is provided with an aperture 46 through which the stem or piston rod 48 of a stationary piston extends. The piston rod 48 is threaded into a piston 50 in the extension 36 and in body contact therewith and having a small aperture 52 formed therein. A cover plate 54 is secured to the cylindrical element 26 by means of screws 56 and the end of the piston rod 48, opposite to the piston 50 passes through an aperture 58 in the cover plate 54. A collar 60 on the piston rod 48 is seated in an enlargement 62 in the aperture 58 and the extending end of the piston rod 48 is threaded at 64 to receive a correspondingly threaded nut 66. A passage 68 leads from the outer end of the piston rod 48 into the chamber 40 and a pipe 70 (designated as 22 in Figure 1) is threaded into the end of the stem 48 to form a connection between the passage 68 and an unloader of a suitable design (not shown).

The aperture 46 in the plug 44 is enlarged and threaded as at 72 to receive packing material 74 and a gland nut 76 which holds the packing in place and thus forms an air tight joint around the piston rod 48. A chamber 78 containing oil or some other liquid is formed in the cylindrical stem 36 of the valve 34.

In the operation of the valve, a spring 80 acting against the piston 50 and the end of the valve 34 keeps the valve on the seat 32 until pressure in the cylinder 4 overcomes the force exerted by the spring 80 in the chamber 78. When the pressure in the cylinder becomes high enough to lift the valve 34 from its seat, oil passes from the chamber 78 through the small aperture 52 and to the upper side of the piston 50. If the unloader discharges pressure fluid suddenly through the pipe 70 and the passage 68 into the chamber 40, the valve 34 will be prevented from returning to its seat 32 with destructive force due to the fact that the liquid above the piston 50 must pass through the small aperture 52 and thus the valve is caused to return gently to its seat.

The structural details of the modification of the valve shown in Figure 3, are very similar to those of the valve just described with the exception of the spring 80 which is placed above the valve and exerts a force between the cover plate 54 and the plug 44. The length of the piston rod 48' is somewhat greater and the stem 36' of the valve 34' is made shorter than the corresponding elements in Figure 2 so as to accommodate a longer spring 80' between the cover 54 and the plug 44.

I claim:

A clearance valve mechanism comprising a guiding element, a valve, a stem on the valve of uniform diameter throughout its length and being slidable in the guiding element, said stem having a chamber therein for cushioning fluid, a closure secured to the stem to seal the chamber and having an aperture, a stationary rod extending through the aperture and into the chamber, a piston in the chamber affixed to the rod and being in body contact with the stem, said piston having a small aperture to permit the restricted flow of cushioning fluid from one side of the piston to the other to retard the movement of the valve, and a spring acting against the valve to actuate said valve longitudinally of the guiding element.

In testimony whereof I have signed this specification.

WILLIAM M. SPOOR.